Feb. 8, 1944.  W. W. ALLEN  2,340,919
BEET TOPPER
Filed Jan. 26, 1943  2 Sheets-Sheet 1

INVENTOR.
W. W. ALLEN
BY Martin E. Anderson
Attorney

Feb. 8, 1944.    W. W. ALLEN    2,340,919
BEET TOPPER
Filed Jan. 26, 1943    2 Sheets-Sheet 2
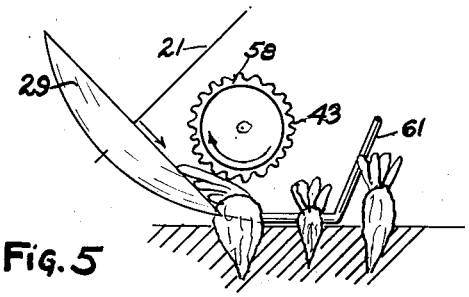
Fig. 5
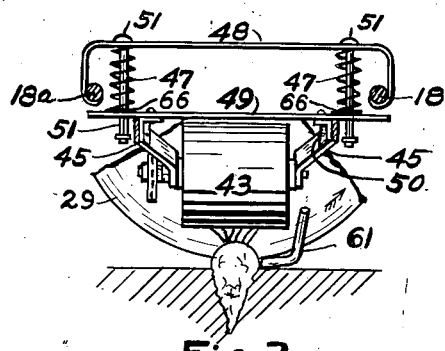
Fig. 3
Fig. 4
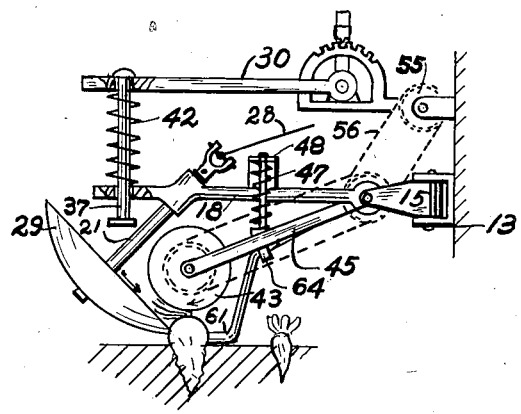
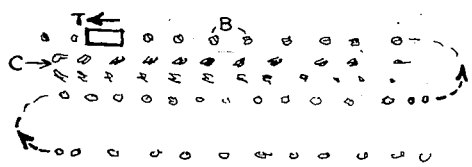
Fig. 6
INVENTOR.
W. W. ALLEN
BY Martin E. Anderson
attorney Patented Feb. 8, 1944

2,340,919

UNITED STATES PATENT OFFICE 2,340,919

BEET TOPPER

Willard W. Allen, Arvada, Colo.

Application January 26, 1943, Serial No. 474,034

10 Claims. (Cl. 55—107)

This invention relates to improvements in mechanical beet toppers.

Sugar beets constitute one of the main agricultural crops in many places of this country and in other countries also. The raising of sugar beets entails a large amount of manual labor when the beets are raised and harvested by the usual methods. In addition to the planting, thinning and cultivating, the beets must be pulled and are then usually topped by hand. Beet topping is an art that requires considerable experience to master and even when beet toppers become experts, the manual labor entailed is very heavy.

In order to decrease the amount of labor necessary for beet harvesting, mechanical beet toppers of various kinds have been invented and some of these have been employed in actual use to some extent.

It is obvious that the successful topping of beets is a matter that involves considerable difficulty and requires machines constructed with a thorough knowledge of the conditions under which they are to operate.

Sugar beets have luxuriant foliage which springs from the crowns of the beets. The crowns project above the surface of the ground and since the beets are of different size, and project unequal distances above the ground, and also because the individual beets have different amounts of foliage, the question of mechanical topping becomes complicated for the reason that each beet must be topped at different distances from the ground.

A problem that has proved very difficult is to produce a machine of such construction that it will properly top a low beet after having topped a high beet, and which will also pass from the low beet to another high beet and top the same at the proper height. Since beets are grown at comparatively short distances apart flat cutter disks have been found unsuited for the purpose for the reason that while resting on a beet that has been topped, they cannot be lowered until the entire disk has been removed from the beet surface.

It is the object of this invention to produce a beet topper that can be attached to a tractor or to a horse drawn truck and which shall be of such construction that the cutter will be automatically adjusted for each individual beet so as to top all of the beets the proper distance.

Another object of this invention is to produce a topping mechanism of such construction that it will not only adjust the cutter vertically to the extent that the beet projects over the ground surface, but which, in addition, will so adjust the cutter with respect to the beets that a tall beet will be topped lower with respect to its crown than a beet that extends a shorter distance above the ground.

Another object of this invention is to produce a beet topper of such construction that the cutter or topper disk can move downwardly below the top of a beet that has just been cut and into a position for cutting a lower beet even when the two beets are normally spaced from each other.

A further object of this invention is to produce a beet topping mechanism that will have a lateral movement relative to the tractor so as to permit it to follow the rows even where they deviate from a straight line.

A still further object of this invention is to produce a beet topper mechanism that, in addition to topping the beets at the proper distance, will also deliver the severed crowns and foliage to one side of the beet row where they may be readily collected by suitable machines.

A still further object of this invention is to produce a beet topping machine that can be readily adjusted while the machine is in operation so as to vary the depth of cut.

And a still further object is to produce a beet topper of a simple and substantial construction that can be manufactured at a reasonable cost, which will be very efficient in its operation and which will have a comparatively small number of parts.

The above and any other objects that may become apparent as this description proceeds are attained by means of a construction and an arrangement of parts that will now be described in detail, and for this purpose reference will be had to the accompanying drawings in which the invention has been illustrated, and in which:

Figure 3 is a section taken on line 3—3, Figures 1 and 2;

Figure 4 is a diagrammatic representation of the machine showing the several elements in the relation in which they occur in the machine;

Figure 5 is a view illustrating the position of the gauge and the cutter element and the purpose of this view is to facilitate the description and the understanding of the invention; and Figure 6 is a diagram showing how the beet tops are removed and deposited between two adjacent rows where they may be readily gathered and removed by suitable machines.

Figure 1:
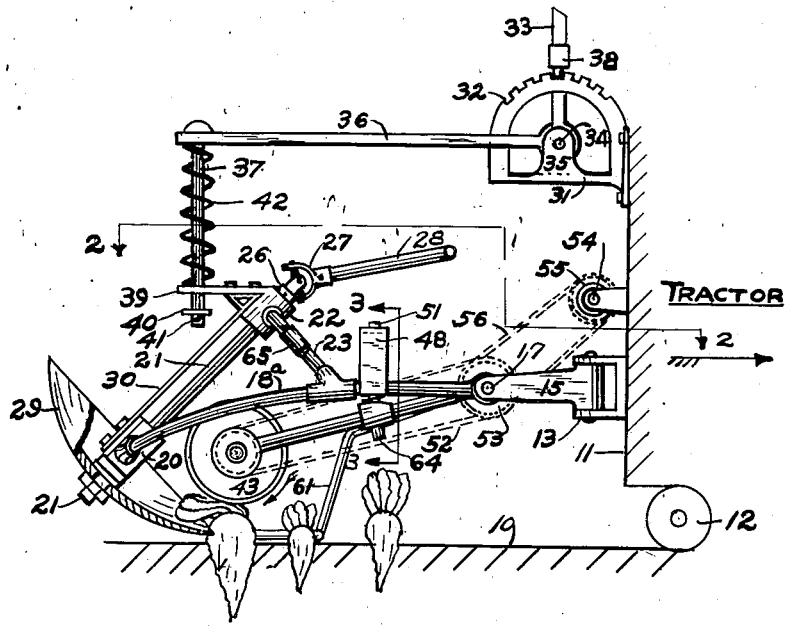
Figure 1 is a side elevation of a machine embodying the principles of this invention, the same being shown attached to a member which indicates a tractor or other mechanism for operating the machine.

Referring now to the drawings in which the invention has been illustrated, reference numeral 10 designates the surface of the ground and reference numeral 11 represents a tractor that is supported on the ordinary wheels 12. The tractor has been merely indicated for the reason that any ordinary farm tractor can be employed, and it is also possible to employ a horse drawn cart from which power may be obtained from the supporting wheels in the manner of an ordinary mowing machine. A bracket 13 has been shown as secured to the rear of the tractor and pivotally supported by this bracket is an arm 14, whose ends 15 are curved rearwardly and provided with bearings 16 for the reception of the shaft 17. A topper frame has its front end pivotally connected with shaft 17. This frame is formed from two reversely curved side members 18 and 18a. The front ends of these members are provided with bearings 19 through which the shaft 17 extends. The rear ends of members 18 curve downwardly as shown in Figure 1 and are attached to a bearing 20 in which the cutter disk shaft 21 is journalled. The upper end of shaft 21 is journalled in another bearing 22 which is supported by outwardly and rearwardly inclined frame members 23. The lower ends of frame members 23 are connected with the side members by means of suitable connectors 24. A transverse frame member 25 has been shown as connecting the lower end of the frame members 23 so as to form a rigid triangular structure. The upper end of shaft 21 is provided with a removable portion 26 that forms part of a universal bearing the other part of which has been designated by reference numeral 27. A shaft 28 extends from the universal to a suitable power takeoff with which most tractors are provided. Secured to the lower end of shaft 21 is a spherical cutting disk 29. This disk is of a fairly large diameter but may be selected of the diameter most suited for the machine.

A rod 30 connects the bearings 20 and 22 and holds them from relative movement in the direction of the length of the shaft 21. Secured to the tractor is a bracket 31 that carries a toothed quadrant 32. A handle 33 is pivoted at 34 to a bearing provided in the upwardly extending bracket 35. In this embodiment and for the purposes of illustration an arm 36 has been shown as integral with the handle 33 and this arm extends rearwardly for some distance and at its rear end it is provided with an opening through which the bolt 37 projects. The handle is provided with an ordinary detent 38 such as is commonly employed in connection with farm machinery and which holds the handle in adjusted position relative to the bracket. A bar 39 is attached to the bearing 22 and extends rearwardly therefrom. This bar has a hole through which the bolt 37 projects. The lower end of bolt 37 has a washer 40 that is held in position by means of a pin 41. A compression spring 42 extends between the arm 36 and the bar 39 and exerts a force tending to separate these two parts. The amount of separation is limited by the washer 40 and the head of the bolt. It is evident that whenever handle 33 is adjusted so as to compress the spring 42, a force will be exerted on the topper frame which tends to move it downwardly and this force will be determined by the amount that spring 42 is compressed. It is evident that unless the cutter disk rests on some support or unless the topper frame is supported by some other means, spring 42 cannot be put under compression.

The topper is provided with a gauge roller 43 that is mounted for rotation about an axle 44 carried by the ends of the gauge frame members 45. It will be seen that these members are provided at their front ends with bearings 46 through which the shaft 17 extends. Springs 47 shown most clearly in Figure 3, extend between the bar 48 that is electro-welded or otherwise secured at its ends to the frame members 18 and 18a and a bar 49 attached to the gauge roller frame members 45 by means of brackets or other suitable means. Bolts 51 extend through the bars 48 and 49 and through the springs. Springs 47 are always under compressive strain but permit the roller to move up and down relative to the cutter disk when passing over the top of the beet.

Referring now more particularly to Figure 4, where the invention has been shown in a diagrammatic manner, it will be seen that when the gauge rollers is raised in its passage over a beet top, it will compress the spring 47 and will also tend to compress the spring 42, but since the spring 42 is much stiffer than the spring 47, it will yield less and therefore the roller 43 will move upwardly a greater distance relative to the disk 29 than frame members 18 will move upwardly relative to rod 30. It will thus be seen that whenever the roller 43 passes over a large or high beet, it will move upwardly relative to the cutting disk 29 but since the frame to which the topper disk is attached also moves upwardly in response to the compression of spring 42, there results a relative movement which produces such an adjustment that the depth of the crown from a very high beet will be less than it would be if frame 18 did not move upwardly in response to the compression of spring 47. This particular feature of this invention is of great practical importance as can be readily seen if we consider a case in which the frame 18 were stationary in a vertical direction, because in such a case the cutter disk or topper disk would always move a fixed distance above the ground surface which, of course, would be entirely impractical. If, on the other hand, the frame 18 were freely movable about the axis of shaft 17, the force required to lift the frame and the topper disk would always remain the same and therefore the depth of crown would always remain the same. With the arrangement shown, however, the depth of crown removed will be dependent on the relative strength of the two springs 42 and 47 and the tension that spring 42 will be subjected to and this can be adjusted by the handle 33. It is therefore possible to adjust the topper so that almost any thickness of crown will be removed as may be found most desirable. It is evident that if the spring 42 is highly compressed, frame member 18 will move upwardly to a smaller degree in response to a certain force exerted thereon by spring 47 than if it were less highly compressed and the relative adjustment of the two springs is therefore very important in connection with the proper operation of this topper.

It will be seen from the drawings that a sprocket wheel 51 is secured to the shaft of roller 43 and connected by means of a sprocket chain 52 with another sprocket wheel 53 secured to shaft 17. A shaft 54 that is driven preferably from the wheels of a tractor, carries a sprocket wheel 55 from which power is transmitted to the shaft 17 by means of a sprocket chain 56 that cooperates with the sprocket wheel 57. Whenever the tractor operates, the roller 43 will be turned in a clockwise direction when viewed as in Figure 1 and the gear ratio is so proportioned that the peripheral speed of the rotor is greater than the lineal speed at which the machine operates and therefore the action of the roller is first to turn the leaves of the beet rearwardly into the position shown in Figures 1 and 5 and when the crown has been severed, it serves to throw the crown onto the rotating disk 29 from which it will be thrown by centrifugal force and deposited to one side of the machine. This action automatically clears the beet tops from the row of beets and places them in convenient position for gathering as will be hereinafter explained in connection with Figure 6.

In Figure 5, the roller has been shown as provided with a longitudinally fluted surface which is preferable to a smooth surface because it exerts a greater force on the foliage. It is the intention to cover the roller with a cylindrical rubber cover having a fluted or otherwise roughened surface. This has been indicated by the part designated by reference numeral 58 in Figure 5.

Figure 2:
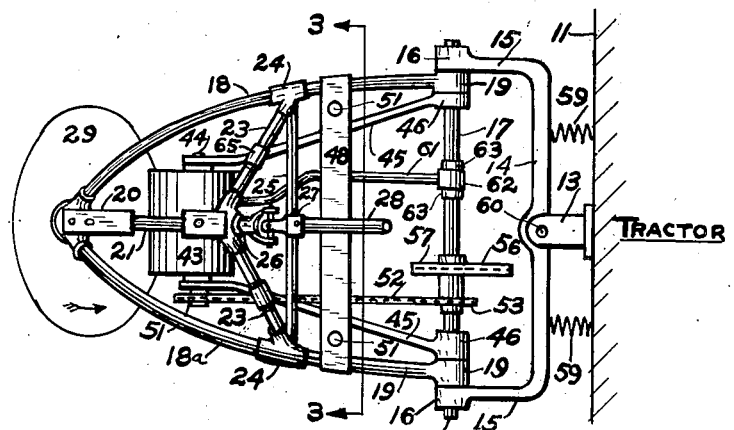
Figure 2 is a top plan view partly in section, looking downwardly along line 2—2, Figure 1.

Referring now to Figure 2, it will be seen that springs 59 are interposed between the rockable bar 14 and the tractor. The object of this construction is to produce an arrangement in which the topping mechanism will have a limited amount of rocking movement about the pivot 60 and will be automatically urged to the position shown by the action of the springs 59.

In the embodiment illustrated the cutter disk is rotated in a counterclockwise direction when viewed as in Figure 3. Since the beet offers some resistance to the rotation of the disk, it is evident that a force is developed that tends to move the disk and the roller towards the left (Figure 3) or downwardly when viewed as in Figure 2. For the purpose of resisting the force above referred to, a runner 61 is secured to the topper frame by means which permits it to normally rest on the surface of the ground adjacent the beets. In the present embodiment the runner or guide 61 has its forward end provided with a hub 62 through which the shaft 17 passes and which is held from lateral movement by collars 63. A U-shaped loop 64 projects downwardly from the transverse bar 49 and guides the runner while permitting slight vertical movement. The runner, being always pressed against the beets, as above explained, tends to keep the roller properly adjusted relative to the rows whenever these deviate from a straight line.

It is desirable to be able to adjust the angular inclination of the shaft 21 with respect to the cutter frame to obtain the best results and in the embodiment illustrated, the frame members 23 are made in two sections and held together by a threaded coupling 65, which has right and left threads that cooperate with the similarly threaded ends of parts 23 so as to form a turnbuckle.

When the machine is to be moved from one field to another and when turning, the topper frame and mechanism may be raised by turning handle 33 in a clockwise direction until the topper frame hangs suspended from bolt 37.

To facilitate the adjustment of the spring 47 relative to spring 42, it may be desirable to provide some means for compressing them more or less, such, for example, as washers 66 interposed between their lower ends and the bar 49.

When mention is made of the relative strengths of springs 42 and 47, the relative upward movement of the roller and the cutter disk due to a certain upward pressure on the bottom of the roller is meant. Since the springs act on different lever arms the actual relative strength of the springs is not the controlling factor. It is evident that any upward movement of the roller will cause some upward movement of the cutter disk regardless of the relative strength of the springs.

In the drawings the machine has been shown in a more or less diagrammatic manner, the intention being to illustrate clearly the essential elements and show them in their proper relation to one another in such a simple manner as to make the principle of operation readily understood. The construction illustrated and described must therefore be understood as showing merely one possible construction, but permitting such modifications to be made as may be found desirable or necessary.

Figure 6 represents a small section of a field in which the rows of beets have been designated by the letter "B" and the topper by "T", while the crowns have been designated by reference letter "C." It will be seen that the tops or crowns are deposited from two adjacent rows on the ground between the rows and this puts them in a position where they may be readily picked up as above mentioned.

From the above description it will be apparent that the machine embodying the principle of this invention will adjust the cutter to the size of the beet in such a way that the amount of crown removed from each beet will be adjusted in accordance with the height of the beet and will therefore produce the least possible amount of waste.

Attention is also called to the fact that due to the dish shape of the topper disk and to the fact that it curves upwardly at a sharp rate, it will not be prevented from dipping down into proper position to cut a short beet if the latter occurs next to a high beet, and this is of considerable importance because the size of beets varies indiscriminately and a successful topper should be so constructed that it will miss as few beets as possible.

Having described the invention what is claimed as new is:

1. A beet topper comprising a topper frame, having its front pivoted at one end to a tractor, a dished cutter disk carried by the free end of the topper frame and mounted for rotation about a rearwardly and downwardly inclined axis, means comprising a spring interposed between the topper frame and the tractor for exerting a downward force on the frame, means for limiting the downward movement of the frame in response to the action of the spring, means for rotating the cutter disk, a gauge device associated with the topper frame and movable vertically relative to the frame and the cutter disk, and means comprising a spring interposed between the gauge and the topper frame for urging the former downwardly with respect to the frame, the strength of the spring urging the topper frame downwardly being greater than that of the spring urging the gauge device downwardly, whereby when the latter is raised relative to the tractor it will also move upwardly relative to the cutter disk.

2. A device in accordance with claim 1 in which the gauge device comprises a roller.

3. A device in accordance with claim 1 in which the gauge device comprises a roller and in which means is provided for rotating the roller at a peripheral speed greater than the lineal speed of the tractor.

4. A beet topper mechanism for attachment to a tractor, comprising, a topper frame pivoted at its forward end to the tractor, a dish-shaped cutter disk carried by the free end of the topper frame for rotation about a downwardly and rearwardly inclined axis, whereby the plane of rotation of the disk will be forwardly and downwardly inclined, means for rotating the disk, means comprising a spring interposed between the tractor and the topper frame for urging the latter downwardly, a gauge device connected with the topper frame for vertical movement relative to the disk, said gauge device being positioned forwardly of the cutter disk, and means comprising a spring for urging the gauge device downwardly relative to the cutter disk.

5. A device in accordance with claim 4 in which the gauge device comprises a roller.

6. A device in accordance with claim 4 in which the gauge device comprises a roller and in which means is provided for turning the roller at a peripheral speed greater than the lineal speed of the topper, whereby the severed crowns will be thrown rearwardly onto the rotating cutter disk.

7. A beet topper, comprising, a topper frame pivoted at its front end to a tractor, a dished cutter disk carried by the free end of the frame and mounted for rotation about a downwardly and rearwardly inclined axis, means comprising a spring interposed between the tractor and the topper frame for urging the latter downwardly, a gauge device comprising a roller, positioned in front of the cutter disk, the roller being connected with the topper frame for vertical movement relative thereto, resilient means for urging the roller downwardly relative to the cutter disk, and means for rotating the roller at a greater peripheral speed than the lineal speed of the topper whereby severed crowns will be thrown onto the rotating disk.

8. A tractor operated beet topping mechanism comprising, a bracket for attachment to a tractor, a bar attached to the bracket for oscillating about a vertical pivot, a beet topper frame attached to the bar for movement about a horizontal axis, means comprising a spring interposed between the tractor and the topper frame for urging the latter downwardly, a dish-shaped cutter disk attached to the rear end of the topper frame for rotation about a downwardly and rearwardly inclined axis, whereby the disk will rotate in a downwardly and forwardly inclined plane, means for rotating the disk, a gauge means for adjusting the cutter disk with respect to the top of the beets, and means comprising a spring interposed between the topper frame and the gauge means, for urging the latter downwardly, the first mentioned spring being stronger than the last mentioned spring whereby the gauge means will move upwardly relative to the tractor at a faster rate than the disk, whereby any upward movement of the gauge means will also produce a corresponding but smaller upward movement relative to the cutter disk.

9. A device in accordance with claim 8 in which the gauge means comprises a roller.

10. A beet topper comprising a topper frame, having its front pivoted at one end to a tractor, a dished cutter disk carried by the free end of the topper frame and mounted for rotation about a rearwardly and downwardly inclined axis, means comprising a spring interposed between the topper frame and the tractor for varying the force urging the frame downwardly, means for limiting the downward movement of the frame in response to the forces acting thereon, means for rotating the cutter disk, a gauge device associated with the topper frame and movable vertically relative to the frame and the cutter disk, and means comprising a spring interposed between the gauge and the topper frame for urging the former downwardly with respect to the topper frame, the forces urging the topper frame downwardly being greater than that of the spring urging the gauge device downwardly, whereby when the latter is raised relative to the tractor, it will also move upwardly relative to the cutter disk.

WILLARD W. ALLEN.